United States Patent [19]
Eberle

[11] 3,982,624
[45] Sept. 28, 1976

[54] APPARATUS AND METHOD FOR HANDLING AND STACKING BATTERY PLATES AND THE LIKE

[75] Inventor: William J. Eberle, Reading, Pa.

[73] Assignee: General Battery Corporation, Reading, Pa.

[22] Filed: Oct. 1, 1974

[21] Appl. No.: 511,054

[52] U.S. Cl. .............................. 198/486; 29/204 R; 198/832; 214/8.5 D; 270/58; 271/9.30 A; 271/104; 271/107; 271/146; 271/171
[51] Int. Cl.² ................. B65G 57/04; H01M 10/14; B65H 1/02; B65H 3/08
[58] Field of Search ................ 198/35, 203; 29/204; 214/6 M, 8.5 D; 271/9, 12, 107, 104, 30 R, 30 A, 149, 150, 171, 167, 169, 146; 192/129 A; 270/58

[56] References Cited
UNITED STATES PATENTS

| | | | |
|---|---|---|---|
| 532,798 | 1/1895 | MacDonald | 192/129 A |
| 2,536,356 | 1/1951 | Dager | 271/9 X |
| 2,558,685 | 6/1951 | Honig | 270/58 |
| 2,626,038 | 1/1953 | Smith | 198/35 |
| 2,704,593 | 3/1955 | Galloway | 198/35 |
| 2,790,536 | 4/1957 | Reed | 198/35 |
| 3,013,796 | 12/1961 | Currie et al. | 271/9 |
| 3,053,529 | 9/1962 | Dunn | 271/107 X |
| 3,334,891 | 8/1967 | Clausen et al. | 271/9 X |
| 3,598,399 | 8/1971 | Cottrell | 271/146 |

Primary Examiner—Evon C. Blunk
Assistant Examiner—Bruce H. Stoner, Jr.
Attorney, Agent, or Firm—Frank J. Benasutti Associates Ltd.

[57] ABSTRACT

Battery plate elements and separator elements are maintained in hopper type sources along opposite sides of a conveyor, and with pivotally swingable vacuum pickup heads serving to withdraw plates and separators from their sources and to deposit them onto a conveyor, with a plurality of plates or separators being withdrawn simultaneously, and with the conveyor being indexed from withdrawal station to withdrawal station for stacking of plates and separators one upon the other, alternately, whereby at any given time a plurality of plate-and-separator sandwiches are being formed, but in different progressive stages. A number of source stations may be deactivated, depending upon the number of plates and separators desired in any given sandwich. Capability is also provided for various size adjustments for handling different sized plates and separators. Particularly novel vacuum operated pickup technique is employed.

7 Claims, 15 Drawing Figures

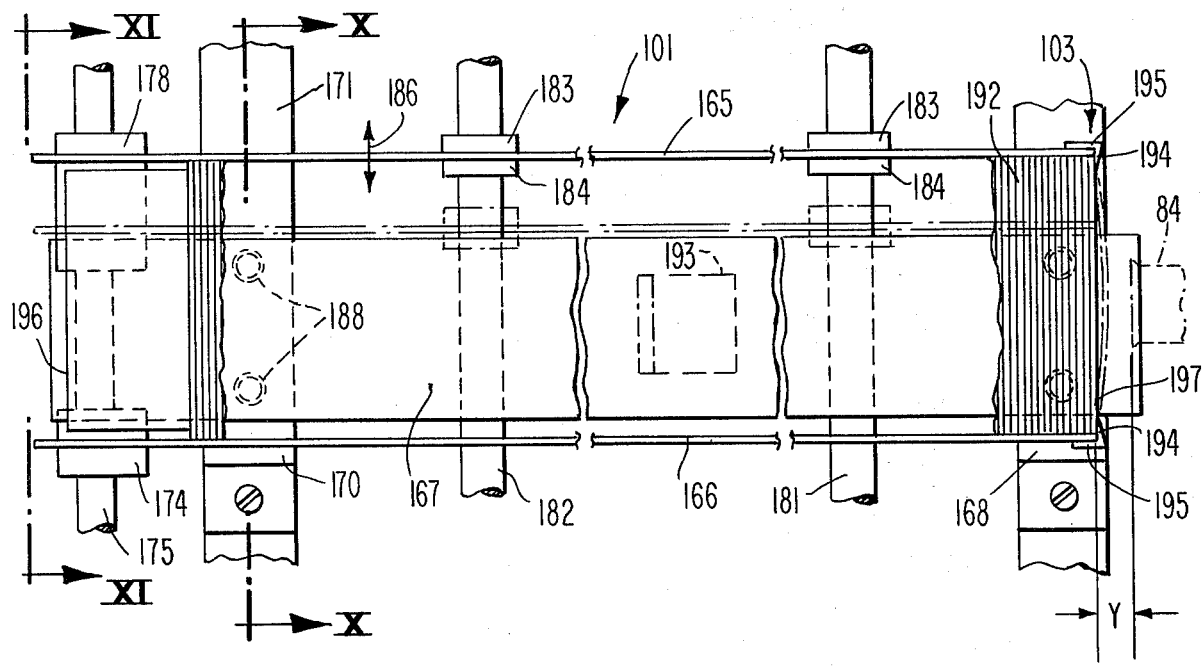
Fig. 9
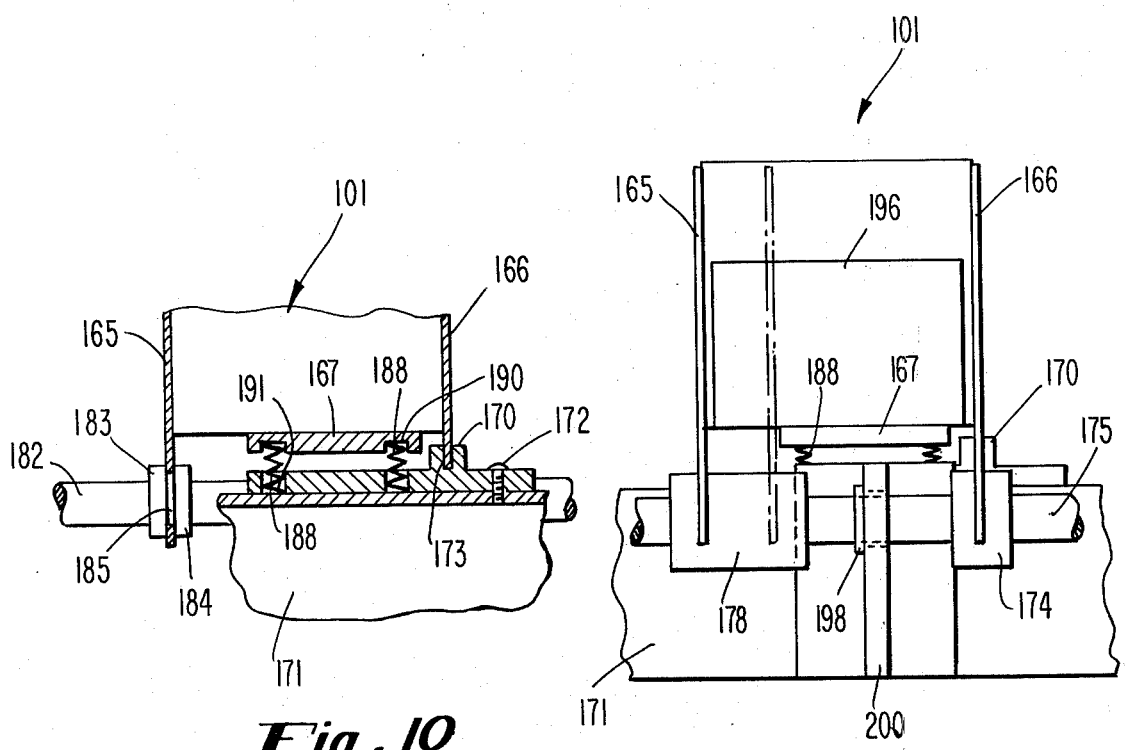
Fig. 10
Fig. 11

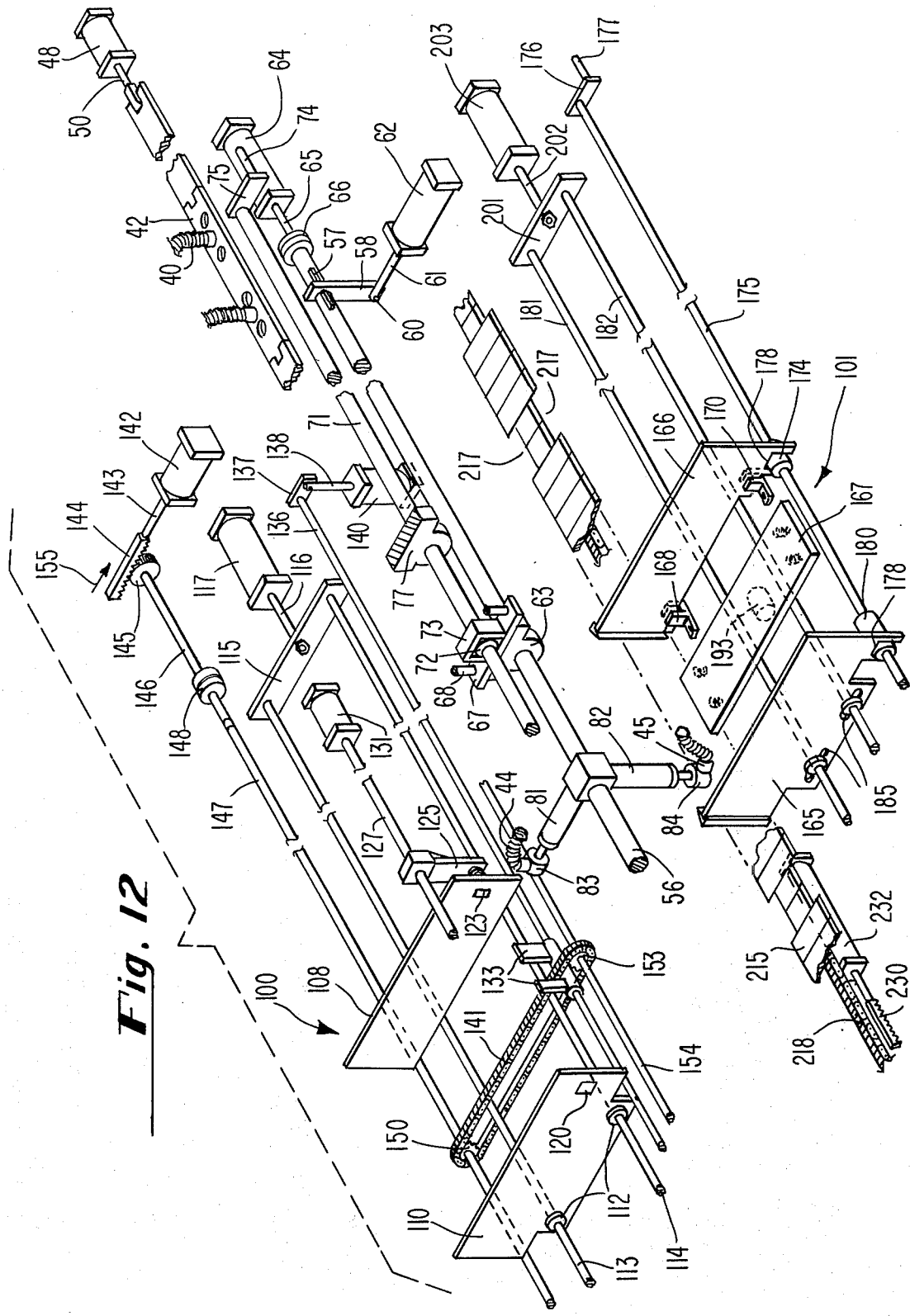

APPARATUS AND METHOD FOR HANDLING AND STACKING BATTERY PLATES AND THE LIKE

BACKGROUND OF THE INVENTION

In the battery making art, sandwiched assemblies of battery plates and elements as assembled for disposition into battery cells have, for a long time, been effected by hand. Such manual assembly techniques have not always been satisfactory, due to inherent stacking irregularities, and also due to the possibilities of human errror, for example, in obtaining assemblies having either too many or too few plates. In other instances, the separators may be provided in inadvertently inverted form, and such may not be detected until a much later stage of battery assembly, or even thereafter, wherein detection only comes to light as an incident of battery malfunction.

In the more recent past, apparatus and techniques have been developed for mechanically feeding battery elements, particularly battery plates, and in some instances the separators that are used for disposition between the plates, whereby stacks of alternate plates and separators are deposited onto a conveyor. Such techniques have generally involved strike arm type of mechanical feeders, whereby an arm, lever or the like directly engages the plates or separators, generally by pushing them out of a hopper onto a conveyor. With such techniques, there is always the possibility of damage to the rather fragile plates, and even to the separators. This is particularly true as the plates become thinner, most especially in the case of separators wherein advances in material construction permit the use of separators far thinner than separators theretofore used. By mechanically striking a separator or plate from the bottom of a hopper and causing the same to be ejected onto a conveyor, not only are limitations imposed upon the type of plates and separators that are susceptible to such treatment, but physical damage to the materials being handled can be encountered. These techniques also have a general lack of ability to quickly change from one size plate-separator combination to another, to accommodate batteries of different sizes. Moreover, such techniques also either make no provision for accomodating assemblies or sandwiches having different numbers of plates, thereby requiring such changes to be effected manually, or else such equipment generally requires shutting-down for extended periods of time while changes are effected.

The present invention is directed to providing a novel apparatus that is mechanized for quick change, for purposes of providing versatility to the apparatus, whereby when it is desired to change from one plate-separator size to another, such changes may rapidly be effected; and whereby, when it is desired to change to battery plate sandwiches having different numbers of plates, these changes may also be rapidly be effected. It is also desired to provide apparatus and techniques whereby the assembly is completely mechanized, whereby plates and separators may be extracted from sources and stacked in precisely the number desired for a given battery cell size, and wherein such stacking is with great precision. It is also desired, and incorporated in the present invention, whereby many sandwiches of battery plate and separator elements may be undergoing assembly concurrently. The present invention is directed to ease of size change as dictated by different sized battery cells requiring differently sized separators and plates, for reasons of versatility.

Also, in the prior art, separators and plates have become substantially thinner so that handling by manual engagement techniques produces damage as has been discussed above, often resulting in breakage. The present invention is addressed to this problem by providing withdrawal of plates and separators from their sources by vacuum withdrawal techniques, whereby such articles may be picked-up with precision, without risking the picking-up of more than one such article from the same source at the same time. It is recognized that techniques may have been developed for vacuum pick up of articles. However, the present invention is addressed to providing a novel technique whereby vacuum picking-up can be accomplished with respect to battery plate elements and battery separator elements, both of which have certain although different degrees of porosity. The present invention is therefore addressed to this problem and provides a technique whereby vacuum heads approach but do not touch the plates and separators to be withdrawn from their hopper sources, but whereby the negative pressure causes a single plate or separator in each instance to be withdrawn into engagement with the vacuum head there being utilized.

SUMMARY OF THE INVENTION

Vacuum withdrawal means are provided for withdrawing plates and separators from their sources or hoppers by bringing vacuum heads predetermined distances close to, but avoiding the touching of, the plates or separators that are desired to be withdrawn. This is to create a reduced pressure zone in front of the plate or separator that is to be withdrawn, in an amount sufficient that the plate or separator that is presented to the vacuum will be withdrawn from the source and moved away from its surface-to-surface engagement with a next adjacent plate or separator as the case may be, before the plate or separator that is being withdrawn has physical contact with the vacuum head. The plate or separator is then deposited onto the conveyor, with the conveyor then being indexed to a next station. The vacuum withdrawal takes place along many stations, such that as a stack being formed on a conveyor is brought to the next station, another plate or separator as the case may be in deposited onto the stack, again with the simultaneous withdraw and deposition of other plates and separators in stacks. Thus, as the conveyor indexes from station-to-station, stacks are each continually built-up of alternate plates and separators.

It is a primary object of the present invention to provide a novel stacking apparatus and method for stacking battery separators and plates.

It is a further object of the present invention to accomplish a novel picking-up of elements for assembly by the use of vacuum pickup.

It is another object of the present invention to accomplish the picking-up and stacking alternately of battery plate elements and battery separator elements for assembly of sandwiches thereof, by the use of vacuum withdrawal from sources of the elements, effective by bringing the vacuum pickup into sufficiently close non-touching proximity to the surfaces of elements that are to be withdrawn that the element to be withdrawn is moved initially out of contact with a next adjacent element in the source, prior to coming into touching engagement with the vacuum pickup means.

It is a further object of this invention to provide, in the battery art, apparatus for continuously manufacturing sandwiches of battery plates and elements in alternately adjacent relationship, whereby stacks of elements progressively build-up on a conveyor as the conveyor moves from station-to-station, toward completion at a final station, but with a plurality of different sandwiches of the plates and elements being added to at each station.

It is another object of this invention to provide a novel battery plate and separator sandwich assembly apparatus wherein a number of stations are provided in the apparatus, with facility being provided for easily using only those stations that are needed to effect the assembly of sandwiches of a desired number of plates and elements.

It is a further object of this invention to accomplish the several objects set forth above, wherein adjustment is provided for easily accomodating different sized plates and separators.

It is a further object of the present invention to provide apparatus having different manners of fine adjustment, different safety features, different manners of control, and efficient adjustment capabilities, and each of them independently.

Other objects and advantages of the present invention will be readily apparent to those skilled in the art from a reading of the brief figure descriptions, the detailed description of the preferred embodiment, and the appended claims, as well as elsewhere herein.

BRIEF DESCRIPTIONS OF THE DRAWING FIGURES

FIG. 9 is an enlarged fragmentary and shortened plan view of the separator source or hopper illustrated in FIG. 2, taken generally along the line IX—IX of FIG. 2.

FIG. 10 is a fragmentary generally vertical sectional view taken generally along the line X—X of FIG. 9, and wherein separator hopper or source details are further illustrated.

FIG. 11 is a generally vertical elevational view of the outer end of one of the separator element source or hopper structures in accordance with the present invention, taken generally along the line XI—XI of FIG. 9. FIG. 12 is a partially exploded view of most of the operative components of the present invention, being illustrated in perspective form, with duplication of stations being omitted where possible, for the sake of clarity.

Figure 13:
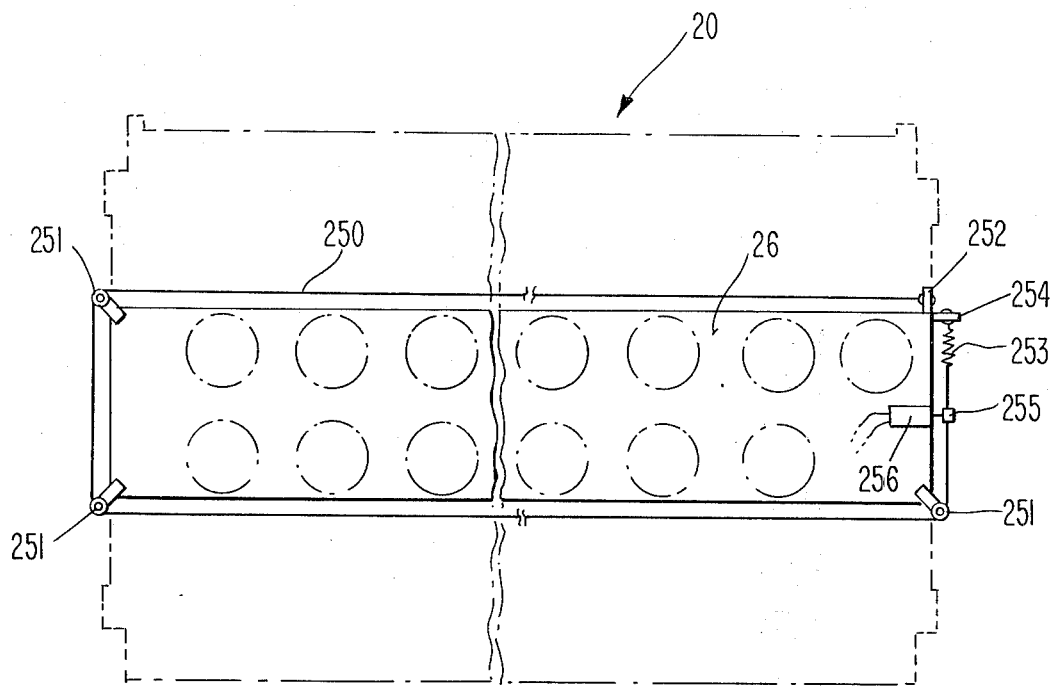

FIG. 13 is a top plan view of an apparatus in accordance with the present invention, longitudinally shortened for the sake of clarity wherein a safety shut-off feature is specifically illustrated schematically, with the outline of the remainder of the apparatus being illustrated in phantom.

Figure 14:
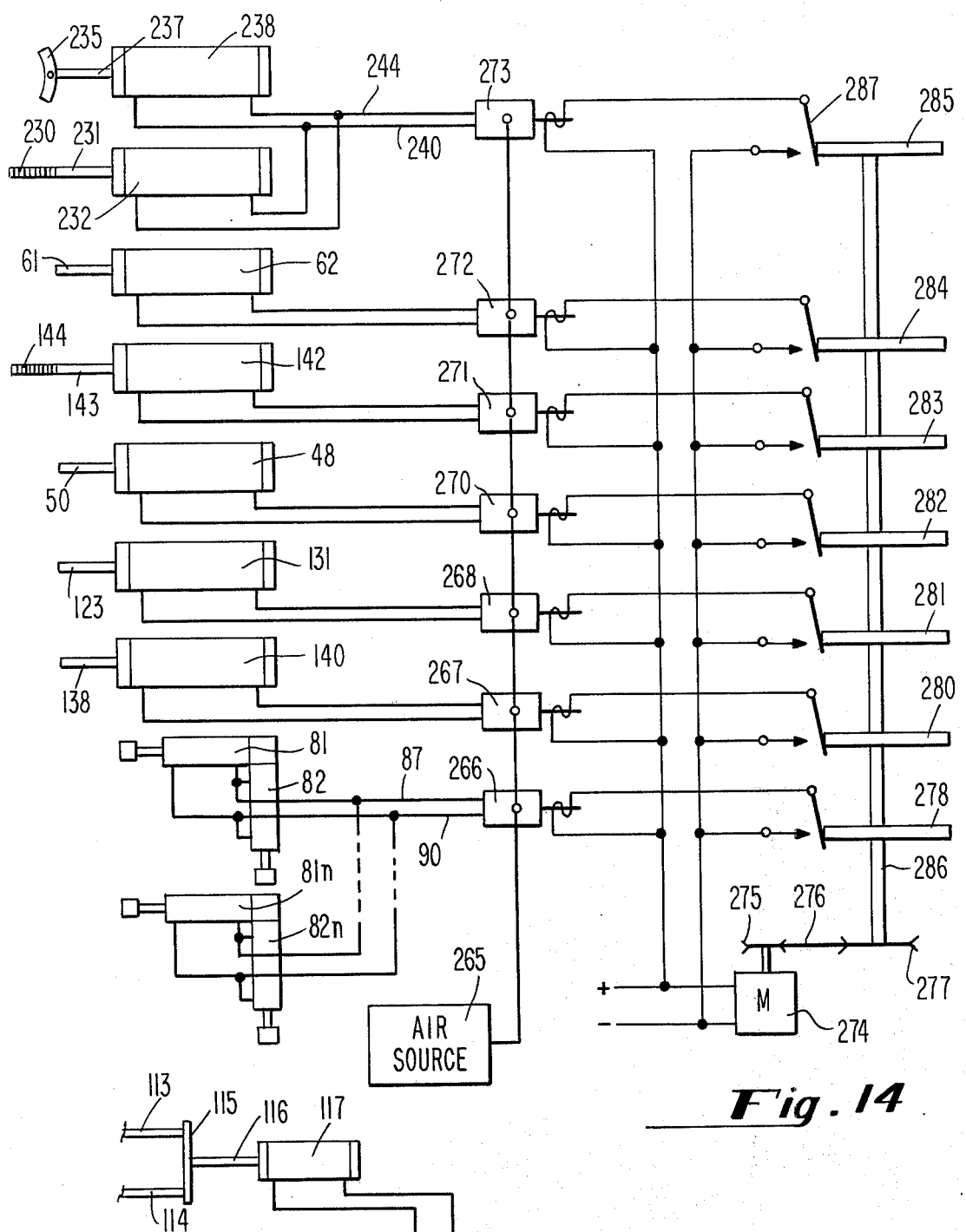

FIG. 14 is a schematic view of the cylinder air source controls in accordance with the present invention.

Figure 15:
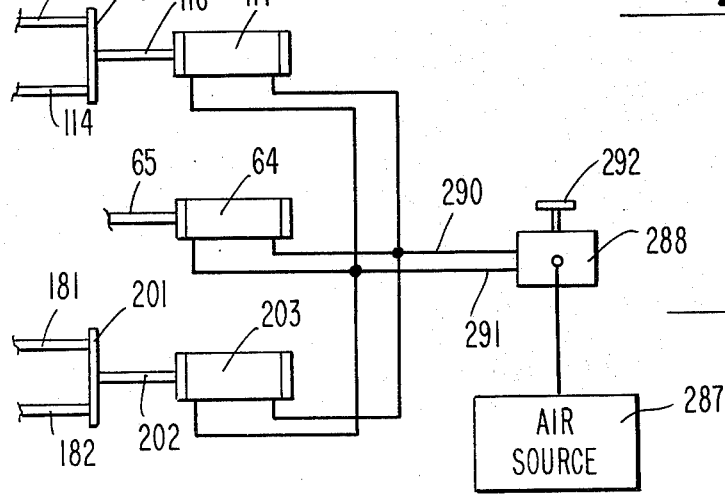

FIG. 15 is a schematic view of certain manually applicable controls for adjusting the apparatus of the present invention for handling different sized plates and separators.

DETAILED DESCRIPTIONS OF THE PREFERRED EMBODIMENTS

Figure 1:
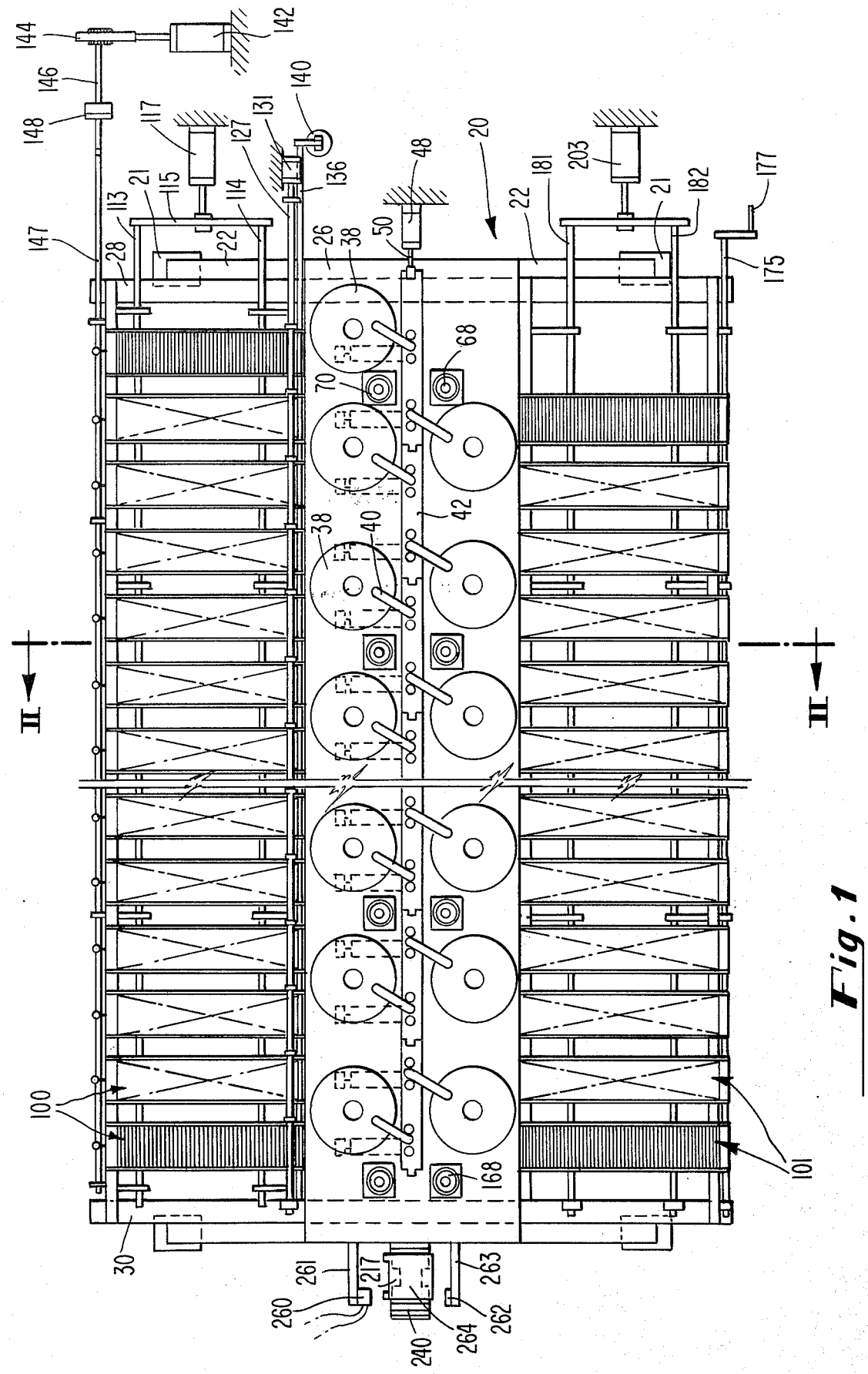
FIG. 1 is a top plan view of an apparatus in accordance with this invention, with certain of the power or drive components being schematically illustrated at the right end thereof, and with the illustration being shortened longitudinally, in the interest of clarity, to omit the further illustration of additional similar stations to those that are illustrated.
Figure 2:
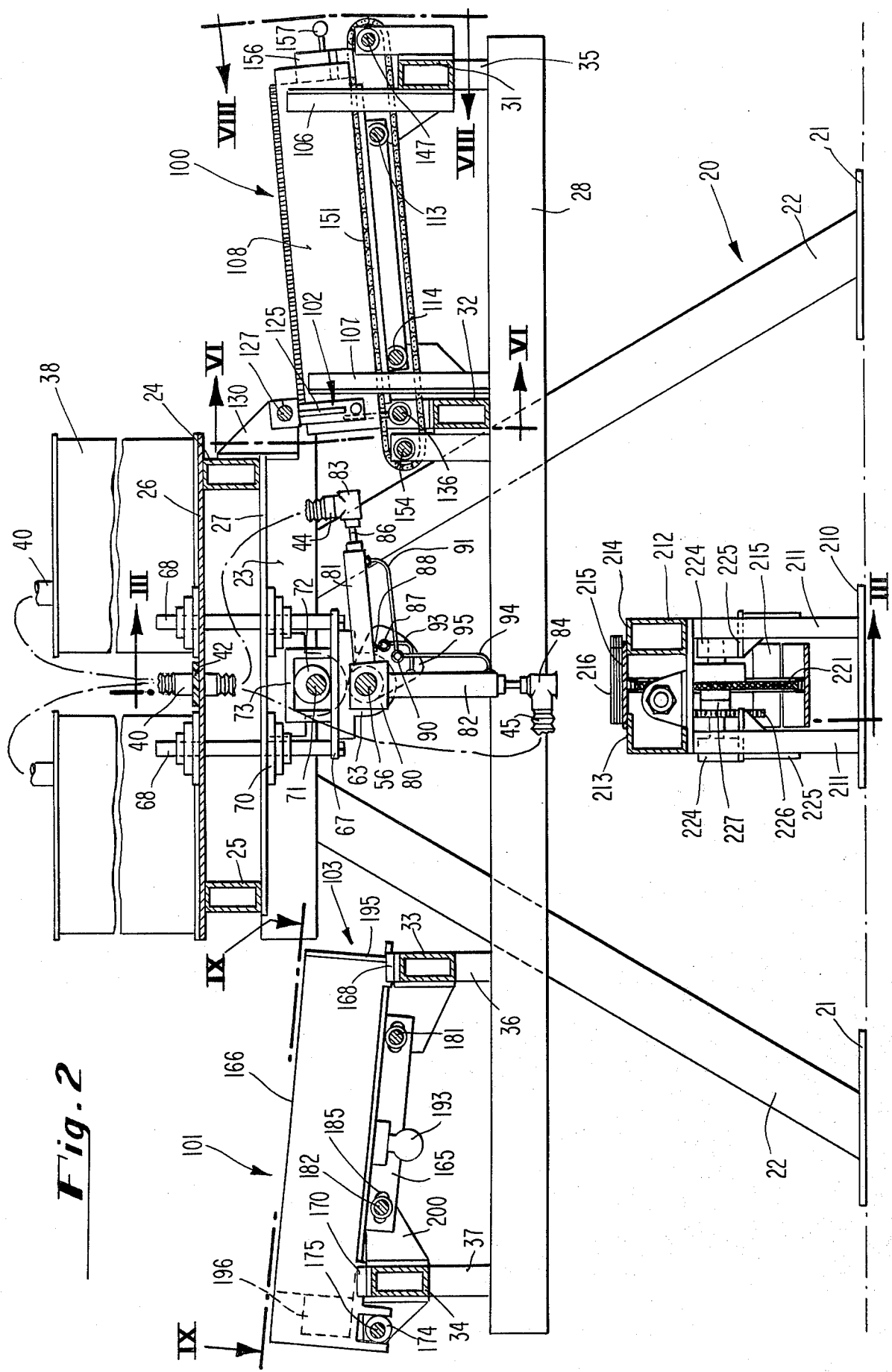
FIG. 2 is an enlarged transverse sectional view, taken through the apparatus of FIG. 1 generally along the line II—II of FIG. 1, wherein a typical plate source, a typical separator source, the conveyor means, and the pivotly movable vacuum withdrawal means are specifically illustrated.

Referring now to the drawings in detail, reference is first made to FIG. 1, wherein there is provided a machine in accordance with the present invention generally designated by the numeral 20. With reference also to FIG. 2, it will be seen that the machine 20 includes a plurality of support feet 21 having angularly disposed support members 22 extending upwardly therefrom to a generally horizontally disposed upper support 23 that in turn carries longitudinally directed horizontal support members 24 and 25, to which in turn are mounted upper and lower horizontal support plates 26 and 27, respectively. The plates 26 and 27, like the support members 24 and 25 run the full length of the machine, generally from the right end to the left end thereof, as viewed in FIG. 1.

A pair of horizontal support members 28 and 30 are provided at opposite ends of the machine, welded or otherwise suitably secured to the legs 22 at each end of the machine, with the support members 28 and 30 in turn having longitudinally disposed support channels 31, 32, 33 and 34 carried thereby, running the length of the apparatus 20, and being disposed at selected elevations for reasons that will be apparent hereinafter, some of which are spaced from the members 28 and 30 by suitable spacer blocks 35, 36 and 37, as illustrated in FIG. 2.

On the top plate 26 of the machine 20, there are provided a plurality of individual vacuum tanks 38, numbering generally 16 in number, although a smaller or larger number may be provided, as desired, depending upon the number of stations to be employed. This is in order to provide one tank for a pair of source stations, with each pair of source stations comprising a separator source station and a plate source station, with the exception of the right end-wise-most station illustrated at the right end of FIG. 1, which is the initial station in the operation of the machine as will be more apparent hereinafter.

The vacuum source tanks 38 are of a generally commercially available type, provided with a vacuum by means of an electrically operated blower or the like, each having a vacuum line 40 thereof of a flexible plastic or like hose type having an end connected into a center hole of a three-hole set in a valve link 42. Generally, there are two sets of three holes each in each link 42, as illustrated in plan in FIG. 1.

Figure 3:
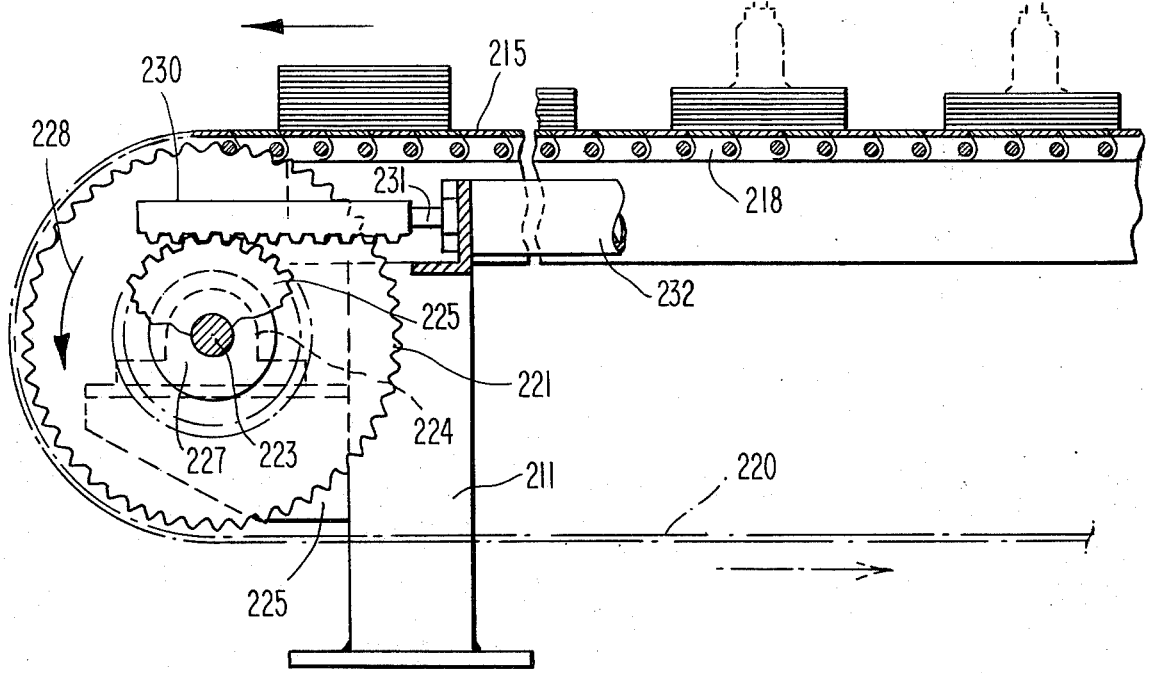
FIG. 3 is an enlarged fragmentary longitudinal sectional view, taken through the apparatus of FIG. 2, generally along the line III—III of FIG. 2 and wherein details of mounting of the pivotaly movable vacuum withdrawal means are illustrated, along with details of the conveyor drive.

With reference to FIG. 3, the link type valve arrangement 42 is operative such that the link 42, for example, is moveable leftwardly and rightwardly as viewed in FIG. 3, such that the vacuum provision through the line 40 may be provided either to the lower vacuum line 44 or lower vacuum line 45, depending upon whether or not the link is in the position illustrated in FIG. 3 with the hose 40 in line connection with the hose 44, or if the link 42 is moved leftward an amount such that the hose 40 will be in line with the hose 45, whereby the hole 46 no longer vents the lower hose line 45 to atmosphere, but whereby the hole 47 in the link 42 vents the hose line 44 to atmosphere. The link valve arrangement 44 is driven at one end by an air cylinder 48 suitably connected thereto by a connection 50, in back-and-forth arrangement, such that the vacuum 40 is always drawing a vacuum through one of the lines 44 or 45, in each set of holes.

Figure 5:
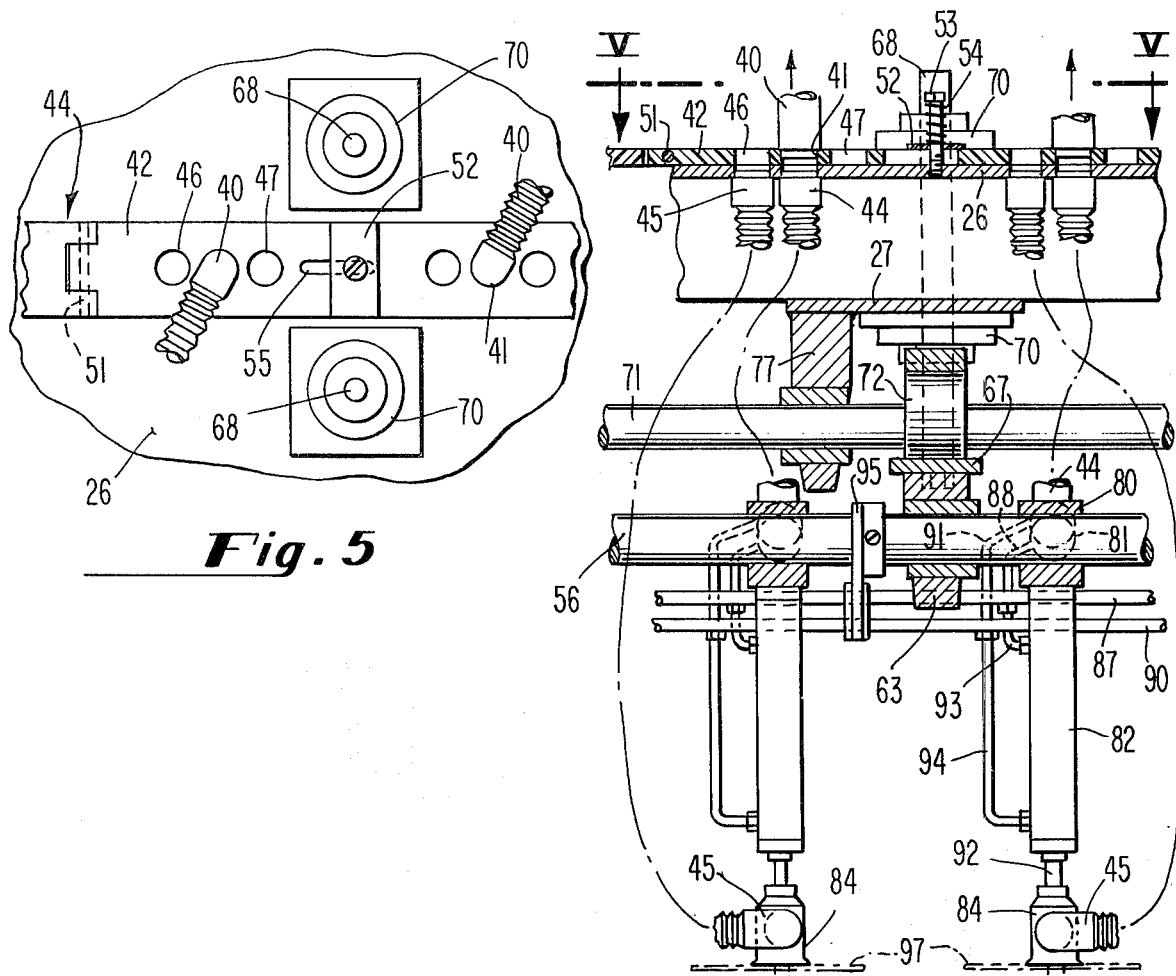
FIG. 5 is an enlarged detail view of the valve mechanism for controlling the vacuum applied to the vacuum heads of the present invention, taken generally along V—V of FIG. 3.

The links 42 are hingedly connected to one another by hinge pins 51 as illustrated in FIG. 5, and slide along the upper surface of upper plate 26, being maintained thereagainst by suitably positioned hold-downs 52. The hold-downs 52 each comprise a plate having a threaded member 53 passing therethrough into threaded engagement in upper support plate 26, but having the plate 52 being slidable relative to the head of the threaded member 53, but being biased downwardly against the associated link 42 by a compression spring 54 in compressed engagement between the head of the threaded member 53 and the hold-down plate 52, with the portion of the threaded member 53 just below the plate 52 being disposed through a slotted hole 55, for sliding engagement of the link 42 relative to the threaded member 53, as the linkage type valve system 44 is moved in its stroke backwardly or forwardly. A plurality of such hold-downs are provided, as are necessary to keep the links 42 against the surface of the upper support member 26.

A main pivot shaft 56 is provided, running the length of the machine, driveable backwardly and forwardly, in an arcuate stroke, through an arc slightly greater than 90°. The shaft 56 is provided with a key 57 mounted therein, about which is disposed a lever arm 58, that in turn is hingedly connected by a suitable pin 60 to a drive rod 61 that in turn is operatively connected to the piston (not shown) of a pneumatic cylinder 62.

With specific reference to FIG. 12, it will be apparent that the link 58 is slotted to accomodate the key 57, so that the shaft 56 is slidable longitudinally (leftwardly and rightwardly) relative to the link 58, in order to facilitate longitudinal adjustment of the vacuum heads relative to central positions of the various stations, as will be discussed more fully hereinafter.

The shaft 56 is therefore driven in it's arcuate or pivoting movement toward and away from positions of element withdrawal by operation of the cylinder 62.

The shaft 56 is supported by a plurality of bearing members 63 that allow for the pivotal movement of the shaft therein, and that also allow for longitudinal movement of the shaft 56 therethrough, as dictated by actuation of a cylinder 64 in those instances when it is desired to adjust the positions of the vacuum heads relative to the element withdrawal stations for accomodating differently sized plates or separators, as will be discussed hereinafter. The cylinder 64, however, has a rod 65 connected to the shaft 56 at the upstream end of the machine by a slip member 66 that enables adjustment of the shaft 56 longitudinally by the cylinder 64, but which prevents the pivotal movement of the shaft 56 as dictated by the cylinder 62 from passing to the piston rod 65.

The bearing members 63 are of a commercially available type and are mounted on a vertically adjustable mounting plate 67 for movement therewith.

The various plates 67 at the locations of the bearing members 63 along the shaft 56 are therefor each carried by posts 68 that are vertically movable through anti-friction type bearing members 70 that in turn are fixedly mounted to upper and lower plates 26 and 27, as illustrated in FIG. 2. The posts 68 and the plates 67 carried thereby and the bearing members 63 and the shaft 56 are therefor movable vertically for purposes of adjusting the vertical position of the shaft 56, an amount dictated by the position of a shaft 71 at any given time, in that the shaft 71 has mounted thereon, for movement therewith, an eccentrically mounted cam 72. A generally inverted U-shaped cam follower 73 is provided, fixedly carried by the plate 67 for vertical movement therewith, such that, as the shaft 71 may be adjusted by manually grasping the handle 74 illustrated in FIG. 12, and with the shaft 71 then being turned a predetermined selected amount dependent upon the pivotal movement of the link 75, the plurality of eccentric cams 72 carried by the shaft 71 (all of which are aligned relative to each other for effecting a uniform adjustment of the shaft 56 as desired) cause a vertical movement of the followers 73 controlled by the guiding of the posts 68 through the bearing members 70.

The shaft 71 in turn is carried by a plurality of suitable bearing members 77 that permit angular adjustment of the shaft 71 therein. The bearing members 77 are all fixedly mounted to a lower plate 27 on the frame or supporting structure of the apparatus 20.

A plurality of cylinder mounts 80 are provided, fixedly mounted for pivotal or arcuate movement with the main shaft 56. Each of the mounts 80 (with the exception of the right end-most mount 80 disposed on the shaft 56 as the shaft is oriented with respect to the illustration of FIG. 1, for reasons that will be apparent hereinafter) is provided with a pair of cylinders 81 and 82 emanating therefrom, at substantially (though slightly greater than) right angles relative to each other, as indicated in FIGS. 2 and 12, for example. The cylinders 81 each have a vacuum operative battery plate element withdrawal head 83 carried thereby (also termed vacuum head herein). Each of the cylinders 82 is provided with a vacuum operative battery separator element withdrawal head 84 (also called vacuum head herein) carried thereby.

In the construction of battery plate-and-separator sandwiches, each sandwich will have a plate as the end element, and therefore each sandwich will have one more plate than separator. To this end, the apparatus of this invention provides one more head 83 than the number of heads 84, in that the number of heads 83 will correspond to the number of battery plate sources or stations, and the number of heads 84 will correspond to the number separator sources or stations.

The heads 83 have the lower-most ends of the flexible tubing 44 connected thereto as illustrated in FIG. 2, and the heads 84 have the lower most ends of the flexible tubing 45 connected thereto. It is therefore seen, as the shaft 56 rocks or pivots back-and-forth, provision of vacuum to the heads 83 and 84 will not be interrupted, except insofar as the provision of vacuum to the lines 44 and 45 is interrupted by the slidable valve arrangement 44 previously discussed.

The cylinder heads 83 are carried on rods 86 for movement toward and away from the associated cylinders 81. The actuation of the pistons (not shown) within the cylinders 81 is of the positive forward, positive reverse type, rather than having a spring return, so to this end compressed air is provided to an appropate end of each cylinder 81, either for outward advance by providing air from line 87 through line 88, or for return of the head 83 by providing air from line 90 through line 91. Similarly the heads 84 are driven outwardly and inwardly by movement of the rods 92 as dictated by movement of pistons within cylinders 82, such piston movement being effected outwardly by delivery of air from line 87 through a line 93, or for return or inward movement of the heads 84 by delivery of air from line 90 through return delivery line 94. The lines 87 and 90 run longitudinally basically the entire length of the apparatus, and are carried by bracket plates 95 that are mounted on and fixedly secured to the main shaft 56, for movement therewith. There will therefore be several bracket plates 95, in order to support the cylinder drive lines 87 and 90. The cylinder drive lines 87 and 90 are provided with compressed air from an air source, in predetermined timed relation, whereby, when the heads 83 are all simultaneously energized (because they are all connected to the same line 87) for movement to extended positions of plate element withdrawal, at the same time the heads 84 are moved to extended positions for separator element deposit onto the conveyor means. Conversely, when separator element withdrawal heads 84 are positioned for withdrawal of separator elements (outwardly extended) but with the heads 84 in positions adjacent the separator element withdrawal stations, the heads 83 will be positioned in vertically downwardly extended positions for deposit of plate elements onto the conveyor means.

With reference to FIG. 3, the full line and phantom positions for the heads 84 are illustrated, whereby the heads 84 are also illustrated as depositing separator elements 97 onto stacks being formed on the conveyor means.

It will further be apparent, that the provision and/ or termination of vacuum to the heads 83 and 84 must be in timed relation with the outward and inward movement of the heads 83 and 84, and to this end the movement of the valve linkage 44 as controlled by the actuation of the cylinder 48 will be such that vacuum is provided to the heads 83 by appropriate positioning of the linkage mechanism 44 when the heads 83 are in positions for withdrawing plate elements as illustrated in FIG. 2, and such vacuum is maintained until the heads 83 have been pivoted downwardly by movement of the shaft 56 through an arc slightly in excess of 90 degrees, at which positions the heads 83, having been withdrawn inwardly for their movement through the arcuate path, will be energized outwardly, still with the vacuum provided thereto, until it is desired to terminate the provision of vacuum to the heads 83, at which time the plate elements carried thereby will be released for depositing onto the stacks being formed on the conveyor means. Similar operation of the heads 84 also occurs.

A plurality of battery plate sources or hoppers 100 are provided, each being substantially identical in construction as illustrated in plan view in FIG. 1. The plate sources 100 are all along one side of the machine. The separator sources 101 are all along the opposite side of the machine as illustrated in FIG. 1.

Leftward of the source 100 as viewed in FIG. 2 there is provided a battery plate withdrawal station generally designated by the number 102. Similarly, on the opposite side of the machine there is a separator plate withdrawal station generally designated by the number 103. There are as many withdrawal stations for the plate elements and separator elements as there are sources therefor.

With respect to the plate sources or hoppers, reference is made in particular to FIGS. 2, 6, 7, 8, and 12.

Figure 7:
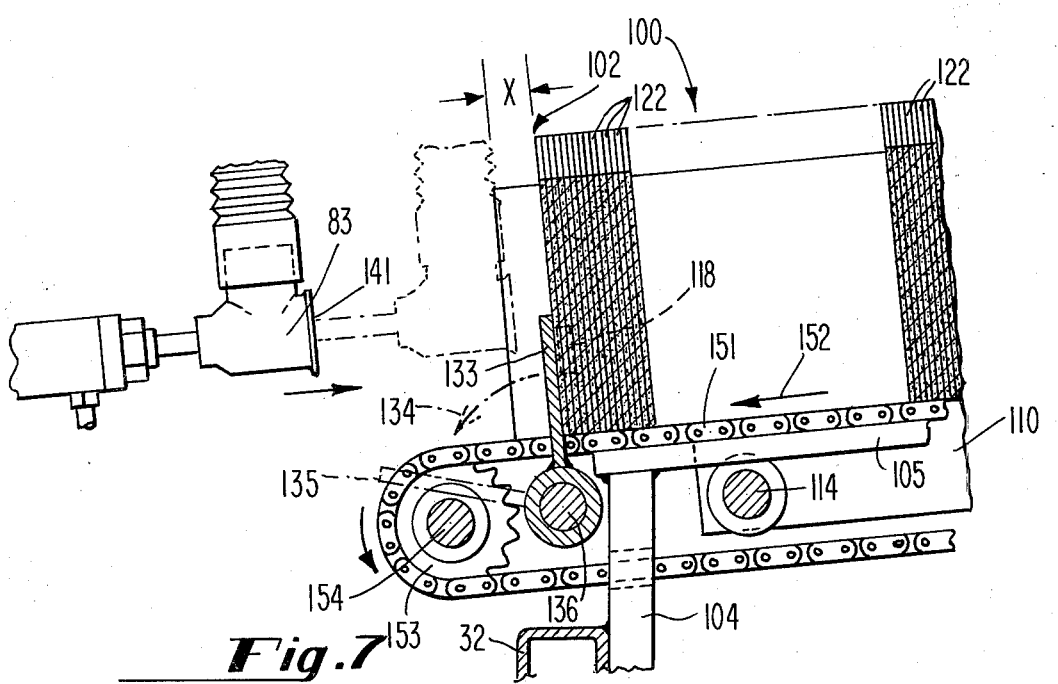
FIG. 7 is a vertical sectional view taken through the apparatus of FIG. 6, generally along the line VII—VII of FIG. 6.

With reference in particular to FIG. 7, there is mounted on channel member 32, an upstanding support member 104, to which there is fixedly mounted a chain support 105. A pair of upstanding angle irons 106, 107, fixedly mount a fixed wall 108 of the plate source 100.

Across the source or hopper 100 is an adjustably positionable wall 110. The wall 110 is adjustably positionable leftward and rightward as viewed in FIG. 8 and as indicated by the movement of the double headed arrow 111 thereof.

The manner in which the wall 110 is moveable is by virtue of its connections 112 to rods 113 and 114 that in turn are connected an adjustably positionable header 115 that in turn is fixedly carried by the rod 116 of a cylinder 117. Therefore, upon actuation of the cylinder 117, as desired, the wall 110 of the source 100 may be moved closer to or further away from the wall 108, for accomodating narrower or wider plates, as desired. It will be understood that the rods 113 and 114 run the length of the apparatus 20, so that actuation of the cylinder 117 can effect adjustment of the width sizes of all of the plate sources 100 simultaneously.

The plates 110 each are provided with fixed friction pads 118 mounted in voids or holes 120 and secured to the walls 110 by suitable fastening members 121. The purpose of the pads 118 is to provide a grip on a few of the end-most ones of the plates 122.

On the opposite side of the pads 118 there are provided, at each source, actuable and deactuable holding means of the pressure foot type 123. This means 123 also comprises a pad, carried on a rod 124 that in turn is slidable in a bracket 125, moveable toward the bracket 125, against the resistance provided by a compression spring 126 disposed on the rod 124 between the pad 123 and bracket 125, and with the bracket 125 being moveable rightwardly as viewed in FIG. 6, with the rightward movement of a rod 127, to which the bracket 125 is secured, and with the rod 127 being in turn mounted for sliding movement through a bearing means 128 that in turn is carried by a mounting bracket 130 that in turn is mounted on channel member 24. It will be apparent that, upon actuation of a cylinder 131, the rod 127 will move longitudinally of the machine, for example, in a rightward direction as viewed in FIG. 6, thereby simultaneously withdrawing all of the pressure feet 123, such that endwise elements 122 in the sources or hoppers 100 are no longer clamped between pads 121 and 123, but so that, if otherwise permitted, all of the plates stacked in the sources 100 as illustrated in FIG. 7 may be indexed toward the withdrawal stations 102 at the left end thereof. It will be noted that all such holding means 123 may be actuated or deactuated concurrently, for the several battery plate sources 100. It will further be noted that such actuation will be automatic, in sequence with the advance of battery plates toward the withdrawal stations thereof.

Just prior to an end-most one of the plates 122 being withdrawn by the head 83, a hold-back plate 133 will be withdrawn from the full line position therefor illustrated in FIG. 7, to undergo an arcuate movement as indicated by the phantom arrow 134 of FIG. 7, to the phantom line position 135 there illustrated. Similar movement for plates 133 of all of the sources 100 will occur simultaneously, upon pivoting of the control rod 136 therefor, which is connected through a lever arm 137 and pushrod 138 to a drive cylinder 140.

Figure 6:
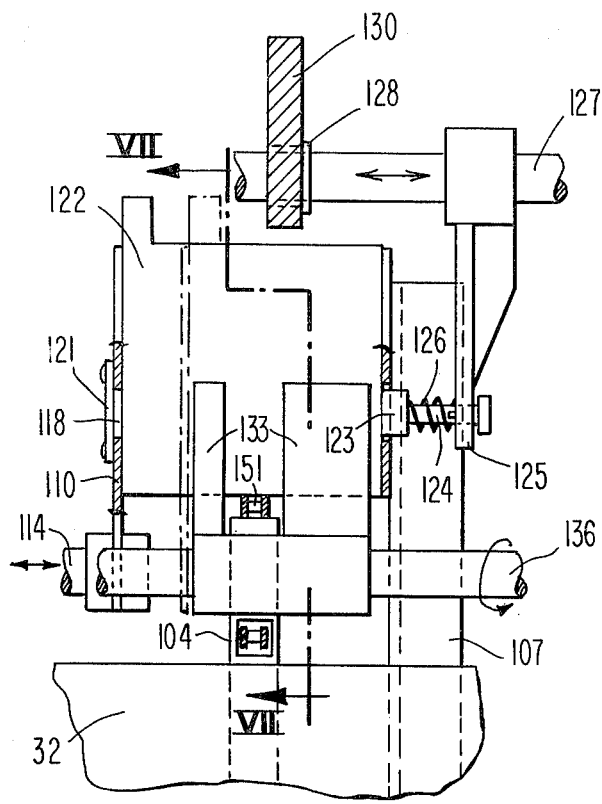
FIG. 6 is an enlarged fragmentary vertical illustration of the outlet of the battery plate source or hopper, taken generally along the line VI—VI of FIG. 2.
Figure 8:
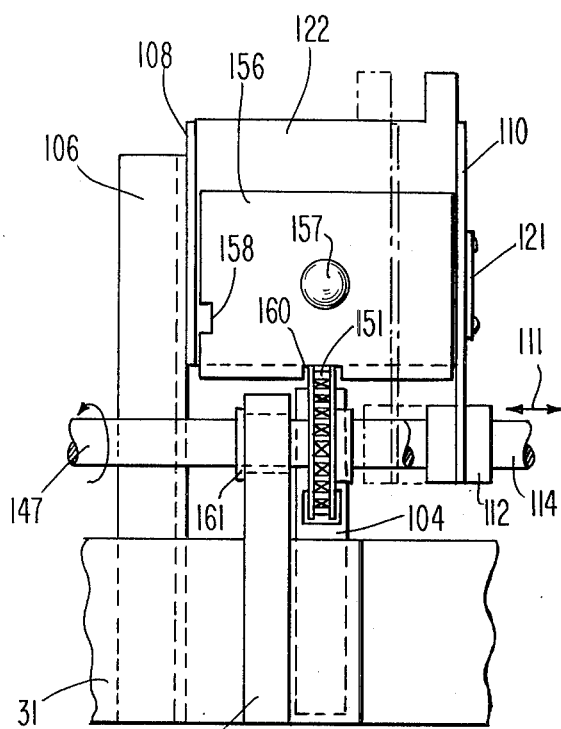
FIG. 8 is an enlarged vertical elevational view of the right end of the plate source apparatus as illustrated in FIG. 2, taken generally along the line VIII—VIII of FIG. 2.

The plate 133 may be of the split type having a slot therebetween for passage of a drive chain 141 therethrough. It will be apparent that the plate 133 is withdrawn to the phantom line position illustrated in FIG. 7, prior to outward movement of the head 83 from the full line position illustrated in FIG. 7, to the phantom line position therefor, and that at such time, the pressure foot 123 will be in a left-most position as illustrated in FIG. 6, cooperating with the fixed pad 118 to tightly engage end-most ones of the plates 122 (except perhaps for the last end-most plate 122, in that the pads can be arranged to only barely grip the end-most plate at all), and the vacuum head 83 will then be able to approach the end-most one of the plates 122 that is presented at the station 102 for withdrawal, an amount sufficiently close to the plate that the negative pressure created by the vacuum may withdraw the plate from the hopper. It will be understood that the head 83 will not touch the plate that is presented for withdrawal, and that such distance can vary depending upon the strength of the vacuum utilized, the weight of the particular plate being utilized, its size, materials of construction and other factors. In any event, it is desired and important not to have the head 83 touch the end-most plate (or separator) because they both are somewhat porous in nature, and it has been found that if the head 83 actually should touch a plate while the plate is still in the hopper, the vacuum source can draw a vacuum through the end-most plate, and that when the head 83 is withdrawn, not only one plate, but a plurality of plates would be withdrawn by each head 83, due to the vacuum being drawn through the pores of the end-most plate. The same can occur with separators.

The heads 83 will thus approach the presented or end-most plates by an amount no closer than the dimension X indicated in FIG. 7, which dimension may vary for the above-discussed reasons, but which may in some instances be for example ⅛ of an inch, and in other instances may be ½ of an inch. The presented plate will then be caused to jump from its station and only thereafter engage the mouth 141 of the head 83. The plate 133 will then be returned to its full line position illustrated in FIG. 7 by appropriate actuation of the cylinder 140, and all such plates 133 associated with the sources 100 will be simultaneously actuated.

It will then be desired to index all the plates 122 in their sources 100 simultaneously, so that a next plate in line is brought to the withdrawal station 102 of each source. Therefore, the rod 127 is actuated to release the pressure feet 123 to positions permitting advancement of the plates 122 and a cylinder 142 is actuated the rod 143 of which is provided with rack teeth 144, in operative engagement with a pinion gear 145 that drives a rod 146, that in turn drives a rod 147 through a one-way sprag clutch 148, whereby the rod 147 may rotate a sprocket 150 that in turn drives chain 151 in the direction indicated by the arrow 152 of FIG. 7 for moving all of the plates 122 carried on the chain 151 further downwardly for presenting another end-most one of the plates 122 at the withdrawal station 102. It will be noted that the other end of each of the chains 151 carried at the various stations 100 will be supported by an appropriate idler sprocket 153 that is carried for idling movement on a fixed rod 154. The cylinder 142 is positively driven in both directions, so that when it is returned, it is desired that such return motion not be transmitted to the rod 147, and it is therefore for this reason that the sprag clutch 148 is utilized, such that the rod 147 is only rotated when the rack 144 is moved in the direction indicated by the arrow 155 of FIG. 12. The pressure feet 123 will then simultaneously be actuated to again engage end-most plates in each stack or source 100 therebetween.

A follower 156 is provided behind the stack of plates in each source, for providing sufficient weight to keep the plate elements compacted therein, closely adjacent to each other. A handle 157 is provided, attached to the follower 156, for facilitating lifting and turning of the same thereof, when needed, or to facilitate taking the follower 156 into and out of the source 100, as needed. It will be noted that the follower 156 is provided with a pair of notches 158 and 160 for clearance of the chain 151 therethrough, with the notches 158 and 160 being provided along two edges to permit use of the same follower for two substantially different spacings of the walls 108 and 110, to accomodate substantially different sized plates (see for example the phantom line positions for the plates 122 illustrated in FIG. 8 as opposed to the full line positions thereof), in that the follower 156 is longer in one dimension than another as viewed in FIG. 8.

It will be noted that the shaft 147 is carried for rotation in a suitable bearing 161 that in turn is carried in a fixture 162 mounted on the structural member 31.

Referring now to FIGS. 9 through 11, in particular, and also to FIG. 12, the separator sources or hoppers 101 are indicated as having their withdrawal stations 103 at which the separator members are presented for suction or vacuum withdrawal by means of the vacuum head 84 for example that is illustrated in phantom at the right end of FIG. 9.

Each source or hopper 101 is provided with a longitudinally movable sidewall 165, a longitudinally fixed sidewall 166 and a bottom wall 167.

The wall 166 is confined against longitudinal movement by inboard and outboard guides 168 and 170, respectively, each of which are suitably secured to a fixedly disposed horizontal portion of support structure 171, by means of threaded fasteners 172 or the like. The guides 170 are provided with slotted holes 173, for the bottom edges of the plates 166 to slide therein, toward or away from the main shaft 56, as dictated by the cams or eccentrics 174 fixedly carried by the shaft 175, that in turn, is manually actuable through a lever arm 176 by grasping and turning a handle 177, for facilitating adjustment of the entire bank of sources 101 closer toward or away from the main shaft 56, such adjustment all being effected simultaneously, in order to bring the separator withdrawal stations to precise positions relative to the heads 84, upon setting up the machine for a given battery sandwich formation.

The hopper wall 165 also has a follower 178 cut into its lower and outward corner, for following a cam 180 that is also carried by the shaft 175. The cam 180 is also eccentric, and mounted in line with the eccentric mounting of the cam 174, for cooperative movement of these cams to move their respectively associated walls in unison.

It will be noted that the eccentrics or cams 180 are somewhat longer than those 174, in order to accomodate longitudinal adjustment of the longitudinally movable wall 165, and a pair of rods 181 and 182 are provided.

The rods 181 and 182 connected to the longitudinally movable sidewall 165 by suitable washers or the like 183, 184, fixedly carried by the rods 181 and 182, with a space therebetween, for accomodating the thickness of the wall 165 passing slidably therebetween. It will be noted that there are slotted holes 185 provided in the sidewall 165 for accomodating the movement of the wall 165 toward and away from the main shaft 56, but yet permitting movement of the wall 165 in the directions indicated by the double headed arrow 186 in FIG. 9.

The bottomwall 167 is spring-mounted on a plurality of compression springs 188 disposed in suitable blind holes 190 in the bottom of the plate 167, and also disposed in blind holes 191 in member 170, in order to provide a resilient mounting for the bottomwall 167 that carries the separators or separator elements 192 therein.

A vibration 193 is provided, disposed beneath the plate 167, for providing a vibratory motion to the plate 167, to "shake-down" the separators into closely adjacent stacked relation, so that an end-most separator as seen at the right in FIG. 9 will be disposed against the inwardly projecting lips 194 of hold-back means 195. It will be seen therefore that the vibrator 193, with the assistance of a weighted block follower 196 will keep the separators ready to immediately assume the position of an end-most separator 197, as soon as such a presented separator is withdrawn from the hopper or source 101. It will thus be apparent that the vibratory motion may be continuously provided, as desired, or can be provided immediately after withdrawal of an end-most separator 197 and then turned off until another separator has been withdrawn. The vibrator 193 may be of the electric motor drive type, or of the air cylinder drive type, as desired. The presented or end-most separators are also porous, and for this reason are approached to the distance Y, in close but non-touching relation with heads 84, for withdrawal by vacuum alone from stations 213, and like the plates, engage the heads only after withdrawal.

The shaft 175 is mounted for rotation is a plurality of bearing members 198, that in turn are carried by mounting brackets 200 that are carried by the machine structure 171.

In FIGS. 9 and 11, there are illustrated full line and phantom positions for the longitudinally movable wall 165. The wall 165, like the wall 110 of the plate source, is adapted to be simultaneously adjusted to a new position for accomodating a different size of elements to be received therein, and with all such source walls 165 being moved simultaneously by moving the rods 181 and 182, that in turn are moved by a header 201 that is driven by the drive rod 202 of a cylinder 203.

With reference now to FIGS. 2, 3, 4 and 12 of the drawings in particular, the conveying means of the present invention will now be described.

Disposed approximately midway of the machine, and extending longitudinally thereof, there is provided a conveyor mechanism, disposed for receiving elements discharged thereto by the heads 83 and 84. The conveyor device includes pedestals 210, upon which are disposed vertical support members 211 that, in turn, carry horizontal supporting structure 212 having upper surface portions 213 and 214, over which ride, generally in sliding relation, links 215 carrying stacks 216 of elements therealong. The conveyor links 215 comprise a plurality of planar surfaces, most of which are substantially equal to, or slightly less than the width of elements to be carried therealong, and these size of links 215 are generally used four together, hingedly connected to each other by hingepins (not specifically illustrated). Others of the links 215 are somewhat shorter widthwise, as illustrated in FIG. 12 and at the left end of FIG. 1, to be substantially less in width than the width of plates to be used therewith, for facilitating the removal of a stack or sandwich of elements at the outlet or left end of the machine as illustrated in FIG. 1. Such removal may be either manually by reaching into the recess 217 formed by one or more adjacent shorter ones of the links, with the hand of a workman, or such may be mechanically effected by a pair of pickup arms adapted to reach into the recesses 217, or by other apparatus not specifically disclosed herein. Generally, all of the links 215, whether narrower or wider, are hingedly connected together, and are also each connected to an endless chain 218, to in effect make an endless conveyor 220. The chain 218 is disposed between the supporting surfaces 213 and 214 and is carried at opposite ends by driven and idler sprockets 221 and 222, respectively. The conveyor 220 runs the entire length of the apparatus, from the right-most station as illustrated in FIG. 1, to the left-most end of the apparatus illustrated in FIG. 1.

The sprocket 221 is fixedly secured to a shaft 223 that, in turn, is mounted in suitable anti-friction bearings 224 that in turn are carried on fixed brackets 225 carried by supports 211.

A driveable pinion gear 226 is also provided, fixedly mounted on the shaft 223, but between the sprocket 221 and the gear 226, the shaft is split and provided with a clutch 227, that may be of the sprag type or otherwise. In any event, the clutch 227 is provided such that, upon driving of the gear 226 in the direction indicated by the arrow 228 in FIG. 3, the sprocket 221 will be similarly rotated. However, upon withdrawal of the rack 230 rightward as viewed in FIG. 3, and upon consequent clockwise movement of the gear 226, it is desired that the conveyor 220 will not move, and consequently, the clutch 227 is effective to disengage the portion of the shaft 223 having the sprocket 221 thereon, immediately upon any clockwise motion being applied to the driven gear 226 as viewed in FIG. 3.

The rack 230 is carried on a rod 231 that, in turn, is driven from the piston of a cylinder 232.

The idler sprocket 222 is fixedly carried on a shaft 233 that is suitably journaled, and with there also being provided fixedly secured to the shaft 233, a cylindrical brake member 234, with a brake shoe 235 being suitably disposed thereabout, connected by a suitable hingepin 236 or the like to a rod 237 that, in turn, is driven from a brake cylinder 238.

Figure 4:
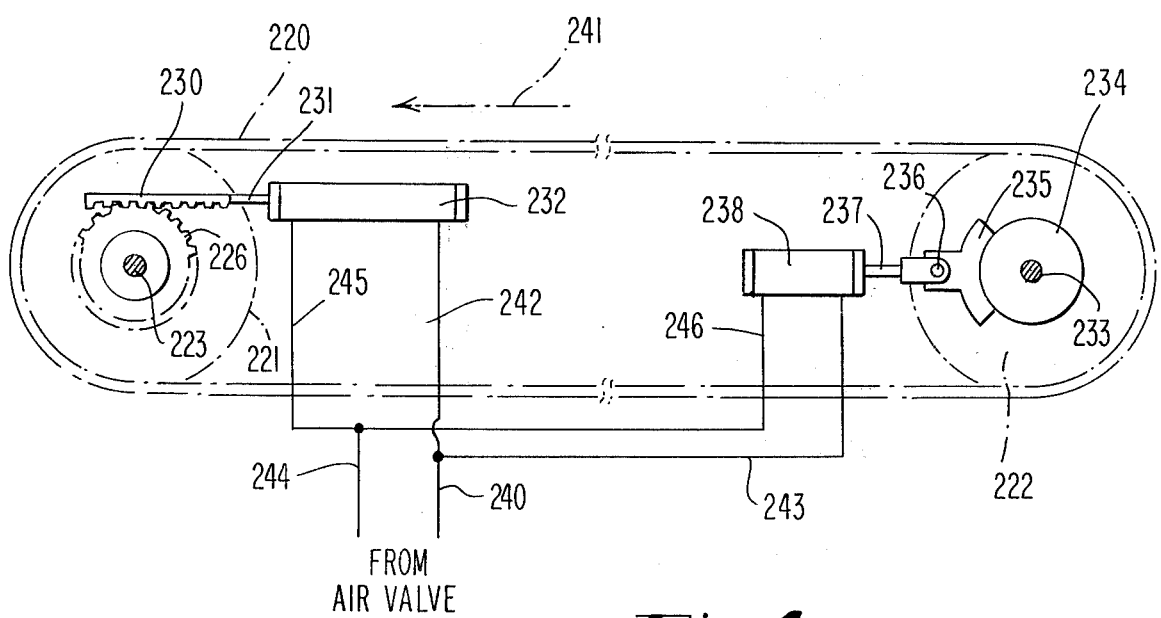
FIG. 4 is a schematic view illustrating the alternately applicable drive and brake system for the conveyor of the present invention.

It is desired to precisely index the conveyor from station-to-station, so that a given separator or plate being deposited onto a stack formation at any position along the conveyor will be deposited precisely thereon, to produce an even stack. It will appreciated that if there were variations in the amount of movement of the upper run of the conveyor, however slight, uneven stacks would be obtained. Accordingly, the conveyor is provided with positive drive and brake systems, interconnected so that, as can be seen from FIG. 4, upon energizing the cylinder 232 from line 240 to drive the sprocket 221 in the counterclockwise direction as viewed in FIG. 4, with air from line 240, and assuming that the arrow 241 of FIG. 4 is in the direction of machine discharge, then the air lines 242 and 243 will simultaneously be actuated such that upon driving of the gear 226, the brake shoe 235 will be released. In reverse manner, when the rack 230 is withdrawn rightward as viewed in FIG. 4, by the provision of air through the line 244 and the line 245, air will likewise be provided through the line 246 to cause the brake to again be operative with the shoe 235 against the hub 234. Thus, the brake is reversely actuated relative to the actuation of the conveyor drive cylinder for precise control over the desired increment of conveyor movement from station-to-station.

It will also be apparent that the various stacks are progressively and continuously being built-up as the conveyor indexes from those stations at the right-most end of the illustration of FIG. 1, to those stations at the left-most end. At each pivotal movement of the main shaft 56 through one arc of slightly more than 90°, a plurality of plate elements are withdrawn from their sources and deposited onto the conveyor. The conveyor is then indexed. Other heads then withdraw separator elements from their sources and deposit them onto the plate elements that have by then been moved into position therebeneath. The process continues from station-to-station, with a given stack at any given time containing as many elements as there are operative sources or stations upstream thereof.

It will be apparent that when starting-up the apparatus, it will be necessary to completely run through the machine once before a complete stack can be formed. By this it is meant that if a given sandwich is to have 17 battery plates and 16 separator plates, and if all the sources are fully stocked with plates or separators as the case may be at the outset, the first sandwich delivered from the machine will have only one plate therein; the second sandwich will have one plate and one separator; the third sandwich will have a plate, with a separator on top thereof, and with another plate on top thereof; and similarly the sizes of the sandwiches will progress until 17 sandwiches have been run through the apparatus and the 17th sandwich will have all 17 elements, as will the 18th, 19th, 20th, etc.

It will also be apparent that various numbers of elements may comprise the sandwiches. For example, it may be desired, in a machine having 17 plate stations and 16 separator stations, to utilize only 7 plate stations and 6 separator stations. In accordance with one feature of the present invention, the undesired stations may be rendered ineffective, by various simple techniques, such as by discontinuing the provision of power to the tanks 38 that supply the vacuum for the stations the use of which is not desired; or in the alternative, the vacuum hoses 40 may be disconnected therefrom. Even further, if desired, the provision of air to those cylinders 81 or 82 at stations the use of which is not desired may be discontinued by any appropriate valve shut-off means not specifically illustrated herein. In any event, it would be understood that, if desired, only those stations at the right-most end of the machine of FIG. 1 may be utilized, or in the alternative those at the left-most end or any other combination of stations as desired.

With reference now to FIG. 13, a safety shut-off feature of the present invention is taught comprising a manually graspable cable 250 disposed around the upper plate 26 of the table illustrated in the plan view of FIG. 13, such cable being held remote from the edge of the upper plate 26 by suitable bracket-mounted idler pulleys 251 fixedly carried by the plate 26, with the cable 250 being mounted fixedly, or anchored at one end 252, and with the other end being engaged with a spring 253, or other resilient member, that in turn is anchored at 254, and with there being connected to the cable 250, a switch actuation device 255, that in turn is connected to a suitable shut-off control 256. Thus, if any malfunction should happen to the machine requiring immediate disconnection of all cylinders, of all drives, and immediate shutdown of the machine in general, any operator, no matter where he may be disposed about the machine 20 may grasp the cable 250 and pull the same, whereby the movement of the cable and the switch actuator 250 connected thereto will cause the control 256 to shut-down the master supply of pneumatic and/or electrical power to the machine. The device 256 is provided with a relay that must be manually actuated before normal operation can be resumed.

With reference to FIG. 1, it will be noted that there is provided at the left-most end thereof an electric eye preferably comprising a single unit of the light-responsive sending-and-receiving type 260, suitably mounted on a support member 261, and with a mirror or other reflective member 262 being provided similarly mounted on a support 263 across the conveyor 220 from the eye 260. The eye components 260 and 262 maay be of any commercially available type, and such an eye may perform any number of desirable functions. For example, if a finished stack or sandwich 264 is ready to be removed from the conveyor 220, but for some reason has not been so removed, an electric eye 260 may be used to detect such nonremoval, and in turn be connected to discontinue all pneumatic and/or electrical power to the machine to shut it down, in order that assembled sandwiches 264 are not discharged onto a floor. In the alternative, an electric eye may be used as a counter, separately, or in conjunction with the use described above, preferably using different mechanisms for each function. Even further, an electric eye may be so positioned to direct the beam across the machine at a given height, for assuring that all sandwiches being delivered therepast have a certain minimum number of elements therein, by interrupting the beam of light with a passing sandwich of the desired predetermined height.

Referring now to FIG. 14 of the drawings, it will be seen that air is provided from an air source 265 and is delivered to fourway valves 266, 267, 268, 270, 271, 272, and 273. The valve 273, when opened, controls the operations of the conveyor drive and brake through cylinders 232 and 238. Similarly, the valve 272 controls the operations of the cylinder 62 that pivots the main shaft 56. The valve 271 controls the cylinder 142 that drives the rack 144 that in turn causes the plate elements to advance in their hoppers or sources. The valve 270 controls the cylinder 48 that in turn controls the provision of vacuum to the vacuum heads. The valve 268 controls the cylinder 131 that in turn controls the operation of the pressure foot that holes plate elements in their hoppers during withdrawal of a plate therefrom. The valve 267 controls cylinder 140 that in turn pivots away the plate hold-back members 133. The valve 266 controls the operation of the cylinders 81 and 82 for extending or withdrawing the vacuum heads thereof. It will be noted that cylinders 81n and 82n are representative of and depict all other cylinders however many in number, needed to correspond to the number of stations embodied in any given apparatus, rather than specifically illustrating a large number of cylinders all similar to those 81 and 82, in the interest of clarity.

An electric motor 274 is utilized, the output shaft of which is provided with a pulley 275 is connected by a suitable belt drive 276 to a driven pulley 277, that in turn has a plurality of cams 278, 280, 281, 282, 283, 284, and 285 disposed thereon, all at their own predetermined orientations relative to the shaft 286, for actuating switches such as 287 in the desired order for permitting the air source to be opened through associated valves such as the valve 273, for example, to actuate the cylinders connected therewith. It will be apparent that the angular disposition of any given cam such as 280 on the shaft 286 can alter the sequence of operation of the cylinder (for example the cylinder 140) associated therewith, and therefor alter the sequence of operations of the various mechanisms of the present invention. It will further be understood that the various mechanisms will operate in the particular sequence described herein for such mechanisms, and that such mechanisms related to each other as heretofore described. Accordingly, it will be appreciated that, as illustrated in FIG. 14, the sequence of operation can be varied as desired to accomplish the ends hereof, by altering the angular placements of the cams on their shaft 286.

With particular reference to FIG. 15, it will be noted that an air source 287 is provided to a hand-actuated valve 288, that may be provided with suitable graduations, for precisely controlling the amount of air permitted to pass to lines 290 and 291 upon manual actuation of the valve handle 292. This is for the purpose of controlling the simultaneous positioning of the longitudinally adjustable element walls through actuation of the cylinders 117 and 203 as heretofore described, along with the simultaneous longitudinal repositioning of the main shaft 56 by actuation of the cylinder 64 therewith. It will further be noted that suitable stops may be utilized for controlling the piston movement in the various cylinders 117, 64 and 203, as desired, which stops may be pre-set if desired. In the alternative, such positions can, if desired, be precisely controlled depending upon the amount of air provided to, and its distribution between lines 290 and 291.

It will be apparent from the foregoing that various modifications may be made in the details of construction and of operation of the apparatus and method of the present invention, all within the spirit and scope of the invention as recited in the appended claims.

I claim:

1. In the battery art, apparatus for continuously manufacturing sandwiches of a first predetermined number of battery plate elements and a second predetermined number of battery separator elements with the plate elements and separator elements being in alternately adjacent relation, comprising:
   a. a plurality of sources of plate elements disposed at stations along a conveyor means;
   b. a plurality of sources of separator elements disposed at stations along said conveyor means;
   c. means for simultaneously adjusting the sizes of said element source stations for accomodating elements of different sizes;
   d. element pickup means for alternately:
      i. substantially simultaneously withdrawing the first predetermined number of said plate elements from a corresponding number of their said sources and depositing them onto said conveyor means, and
      ii. substantially simultaneously withdrawing the second predetermined number of said separator elements from a corresponding number of their said sources and depositing them onto said previously deposited elements on said conveyor means;
   e. means for simultaneously adjusting the positions of said pickup means relative to said stations for accomodating the picking-up of elements of different sizes; and
   f. means for moving said conveyor means relative to said sources sequentially between stations to traverse the source stations of plate elements and separator elements for bringing elements previously deposited onto said conveyor means at stations, into positions for receiving additional elements thereon to form stacks of elements at said stations.

2. The apparatus of claim 1 wherein the sources of elements are disposed for sequentially presenting surfaces of the elements in each source toward the pickup means at the said stations and wherein said element pickup means comprises vacuum head means movable toward and away from the stations at which element surfaces are presented, the pickup means having means for moving the vacuum head means to positions in sufficiently close nontouching proximity to the presented element surfaces at stations that the negative pressure provided by the vacuum pickup means through said vacuum head means, alone, draws said presented elements from their sources into engagement with the vacuum head means for deposition thereafter.

3. In the battery art, apparatus for continuously manufacturing sandwiches of a first predetermined number of battery plate elements and a second predetermined number of battery separator elements with the plate elements and separator elements being in alternately adjacent relation, comprising:
   a. a plurality of sources of plate elements disposed at stations along a conveyor means and adapted to receive elements in serially adjacent relation;
   b. a plurality of sources of separator elements disposed at stations along said conveyor means;

c. element pickup means for alternately:
   i. substantially simultaneously withdrawing the first predetermined number of said plate elements from a corresponding number of their said sources and depositing them onto said conveyor means and
   ii. substantially simultaneously withdrawing the second predetermined number of said separator elements from a corresponding number of their said sources and depositing them onto said previously deposited elements on said conveyor means;
d. said sources of elements disposed for sequentially presenting surfaces of the elements in each source toward the pickup means at the said stations;
e. said element pickup means comprising vacuum head means movable toward and away from the stations at which element surfaces are presented, the pickup means having means for moving the vacuum head means to positions in sufficiently close non-touching proximity to the presented element surfaces at stations that the negative pressure provided by the vacuum pickup means through said vacuum head means, alone, draws said presented elements from their sources into engagement with the vacuum head means for deposition thereafter;
f. automatically responsive hold-back means for holding back other plate elements of the said plate element sources other than plate elements then currently presented for withdrawal, said hold-back means being movable between engaged and release positions, with means for timed operation thereof relative to actuation of an associated said vacuum head means; and
g. means for moving said conveyor means relative to said sources sequentially between stations to traverse the source stations of plate elements and separator elements for bringing elements previously deposited onto said conveyor means at stations, into positions for receiving additional elements thereon to form stacks of elements of said stations.

4. In the battery art, apparatus for continuously manufacturing sandwiches of a first predetermined number of battery plate elements and a second predetermined number of battery separator elements with the plate elements and separator elements being in alternately adjacent relation, comprising:
a. a plurality of sources of plate elements disposed at stations along a conveyor means;
b. a plurality of sources of separator elements disposed at stations along said conveyor means and adapted to receive elements in serially adjacent relation;
c. element pickup means for alternately:
   i. substantially simultaneously withdrawing the first predetermined number of said plate elements from a corresponding number of their said sources and depositing them onto said conveyor means and
   ii. substantially simultaneously withdrawing the second predetermined number of said separator elements from a corresponding number of their said sources and depositing them onto said previously deposited elements on said conveyor means;
d. said sources of elements disposed for sequentially presenting surfaces of the elements in each source toward the pickup means at the said stations;
e. said element pickup means comprising vacuum head means movable toward and away from the stations at which element surfaces are presented, the pickup means having means for moving the vacuum head means to positions in sufficiently close non-touching proximity to the presented element surfaces at stations that the negative pressure provided by the vacuum pickup means through said vacuum head means, alone, draws said presented elements from their sources into engagement with the vacuum head means for deposition thereafter;
f. vibratory indexing means for indexing separator elements to withdrawal stations in their said sources following withdrawal of next previous said separator elements from their sources by said pickup means; and
g. means for moving said conveyor means relative to said sources sequentially between stations to traverse the source stations of plate elements and separator elements for bringing elements previously deposited onto said conveyor means at stations, into positions for receiving additional elements thereon to form stacks of elements at said stations.

5. The apparatus of claim 4, wherein fixedly disposed stop means are provided at said separator element stations for limiting separator element advance.

6. In the battery art, apparatus for continuously manufacturing sandwiches of a first predetermined number of battery plate elements and a second predetermined number of battery separator elements with the plate elements and separator elements being in alternately adjacent relation, comprising:
a. a plurality of sources of plate elements disposed at stations along a conveyor means and adapted to receive elements in serially adjacent relation;
b. a plurality of sources separator elements disposed at stations along said conveyor means;
c. element pickup means for alternately:
   i. substantially simultaneously withdrawing the first predetermined number of said plate elements from a corresponding number of their said sources and depositing them onto said conveyor means and
   ii. substantially simultaneously withdrawing the second predetermined number of said separator elements from a corresponding number of their said sources and depositing them onto said previously deposited elements on said conveyor means;
d. said sources of elements disposed for sequentially presenting surfaces of the elements in each source toward the pickup means at the said stations;
e. said element pickup means comprising vacuum head means movable toward and away from the stations at which element surfaces are presented, the pickup means having means for moving the vacuum head means to positions in sufficiently close non-touching proximity to the presented element surfaces at stations that the negative pressure provided by the vacuum pickup means through said vacuum head means, alone, draws said presented elements from their sources into engagement with the vacuum head means for deposition thereafter;

f. releasable stop means at said plate element stations for limiting plate element advance, with means for timed release thereof relative to actuation of an associated said vacuum head means; and g. means for moving said conveyor means relative to said sources sequentially between stations to traverse the source stations of plate elements and separator elements for bringing elements previously deposited onto said conveyor means at stations, into positions for receiving additional elements thereon to form stacks of elements at said stations.

7. In the battery art, apparatus for continuously manufacturing sandwiches of a first predetermined number of battery plate elements and a second predetermined number of battery separator elements with the plate elements and separator elements being in alternately adjacent relation, comprising:

a. a plurality of sources of plate elements disposed at stations along a conveyor means and adapted to receive elements in serially adjacent relation;

b. a plurality of sources of separator elements disposed at stations along said conveyor means;

c. element pickup means for alternately;
  i. substantially simultaneously withdrawing the first predetermined number of said plate elements from a corresponding number of their said sources and depositing them onto said conveyor means and
  ii. substantially simultaneously withdrawing the second predetermined number of said separator elements from a corresponding number of their said sources and depositing them onto said previously deposited elements on said conveyor means;

d. said sources of elements disposed for sequentially presenting surfaces of the elements in each source toward the pickup means at the said stations;

e. said element pickup means comprising vacuum head means movable toward and away from the stations at which element surfaces are presented, the pickup means having means for moving the vacuum head means to positions in sufficiently close non-touching proximity to the presented element surfaces at stations that the negative pressure provided by the vacuum pickup means through said vacuum head means, alone, draws said presented elements from their sources into engagement with the vacuum head means for deposition thereafter; said pickup means including an elongated shaft means with a number of vacuum head means mounted thereon corresponding in number to the number of element source stations; the means for moving said pickup means including means for pivoting the vacuum head means between plate element source stations, separator element source stations and said conveyor means;

f. means for automatically controlling the provision of vacuum to said vacuum head means in predetermined fashion whereby vacuum is substantially simultaneously provided to either all predetermined ones of said head means in positions to withdraw plate elements from their said sources, or all predetermined ones of said head means in positions to withdraw separator elements from their said sources;

g. means for simultaneously adjusting the sizes of said element source stations for accommodating elements of different sizes, having means for simultaneously adjusting the positions of said pickup means relative to said stations for accommodating the picking-up of elements of different sizes;

h. automatically responsive hold-back means for holding back other plate elements of the said plate element sources other than plate elements then currently presented for withdrawal, said hold-back means being movable between engaged and release positions, with means for timed operation thereof relative to actuation of an associated said vacuum head means; with means for positively indexing plate elements to withdrawal stations in their said sources following withdrawal of next previous said plate elements from their sources by said pickup means; with releasable stop means at said plate element stations for limiting plate element advance;

i. means for moving said conveyor means relative to said sources sequentially between stations to traverse the source stations of plate elements and separator elements for bringing elements previously deposited onto said conveyor means at stations, into positions for receiving additional elements thereon to form stacks of elements at said stations; said means for moving said conveyor means comprising positive conveyor drive means and positive brake means, having means for oppositely and simultaneously actuating said drive means and brake means, whereby precise positioning of said conveyor means from station-to-station is effected; and j. all of said element pickup means, conveyor moving means, means for moving vacuum head means, pivoting means, means for controlling the provision of vacuum to the vacuum head means, all said adjusting means, hold-back means, means for timed release, positive indexing means, releasable stop means, positive conveyor drive means, and positive conveyor brake means being of the pneumatic cylinder powered type.

* * * * *